US012591807B2

(12) United States Patent
Mukherjee et al.

(10) Patent No.: US 12,591,807 B2
(45) Date of Patent: Mar. 31, 2026

(54) SKETCHED AND CLUSTERED FEDERATED LEARNING WITH AUTOMATIC TUNING

(71) Applicants:International Business Machines Corporation, Armonk, NY (US); Rensselaer Polytechnic Institute, Troy, NY (US)

(72) Inventors: Arpan Mukherjee, West Bengal (IN); Georgios Kollias, White Plains, NY (US); Theodoros Salonidis, Wayne, PA (US); Shiqiang Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 18/149,682

(22) Filed: Jan. 4, 2023

(65) Prior Publication Data

US 2024/0070531 A1      Feb. 29, 2024

(30) Foreign Application Priority Data

Aug. 29, 2022      (GR) ............................... 20220100714

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06N 20/20; G06N 3/08; G06N 3/084; G06N 3/098
See application file for complete search history.

(56) References Cited

U.S. PATENT DOCUMENTS

| | | |
|---|---|---|
| 2020/0372380 A1 | 11/2020 | Liu |
| 2021/0158099 A1 | 5/2021 | Tuor |
| (Continued) | | |

FOREIGN PATENT DOCUMENTS

| | | |
|---|---|---|
| CN | 110598870 A | 12/2019 |
| CN | 113191484 A | 7/2021 |
| (Continued) | | |

OTHER PUBLICATIONS

Anonymous Author, "Data-aware Adaptive Client Selection in Federated Learning", Under review by Aistats 2022, 9 pages.

(Continued)

*Primary Examiner* — Grace Park
(74) *Attorney, Agent, or Firm* — Anthony Curro

(57) ABSTRACT

A computer-implemented method, a computer program product, and a computer system for automatic adaptive client selection in federated learning. A server sends parameters of a machine learning model to all of clients, where all of the clients compute respective gradients using the parameters. The server receives sketches of the respective gradients, where the sketches are computed by all of the clients. The server uses the sketches to compute similarity between all of the clients and clusters the all of the clients based on the similarity. The server optimizes a number of client clusters and a dimension of the sketches, subject to a constraint of memory consumption, a constraint of communication overhead, and a performance metric. The server determines a subset of the clients that send the respective gradients, by selecting the clients from the client clusters. The server aggregates the respective gradients sent by the subset of the clients.

20 Claims, 4 Drawing Sheets

(56)                References Cited

U.S. PATENT DOCUMENTS

| | | | | |
|---|---|---|---|---|
| 2021/0373977 A1* | 12/2021 | Javeed | ............... | G06F 18/2433 |
| 2022/0076169 A1 | 3/2022 | Wang | | |
| 2023/0177349 A1* | 6/2023 | Balakrishnan | ......... | G06N 3/084 |
| | | | | 706/25 |
| 2023/0325652 A1* | 10/2023 | Balevi | ..................... | G06N 3/08 |
| | | | | 706/12 |

FOREIGN PATENT DOCUMENTS

| | | |
|---|---|---|
| CN | 113378474 A | 9/2021 |
| CN | 113780344 A | 12/2021 |
| CN | 113988314 A | 1/2022 |
| WO | 2021201370 A1 | 10/2021 |

OTHER PUBLICATIONS

Fraboni et al., "Clustered Sampling: Low-Variance and Improved Representativity for Clients Selection in Federated Learning", Proceedings of the 38 th International Conference on Machine Learning, PMLR 139, 2021, arXiv:2105.05883v2 [cs.LG] May 21, 2021, 17 pages.

Konecny et al., "Federated Learning: Strategies for Improving Communication Efficiency", arXiv:1610.05492v2 [cs.LG] Oct. 30, 2017, 10 pages.

McMahan et al., "Communication-Efficient Learning of Deep Networks from Decentralized Data", Proceedings of the 20th International Conference on Artificial Intelligence and Statistics (Aistats) 2017, Fort Lauderdale, Florida, 10 pages.

Mukherjee et al., "Sketched and Clustered Federated Learning With Automatic Tuning", Greece Application No. 2410-0004571115, Filed Aug. 29, 2022, 38 pages.

Nishio et al., "Client Selection for Federated Learning with Heterogeneous Resources in Mobile Edge", arXiv:1804.08333v2 [cs. NI], Oct. 30, 2018, 7 pages.

Wang et al., "Adaptive Federated Learning in Resource Constrained Edge Computing Systems", arXiv:1804.05271v3 [cs.DC] Feb. 17, 2019, 20 pages.

Mukherjee et al., "Sketched and Clustered Federated Learning With Automatic Tuning", Greece Application No. 20220100714, Filed Aug. 29, 2022, 38 pages.

Huang et al., "An Efficiency-Boosting Client Selection Scheme for Federated Learning With Fairness Guarantee", https://ieeexplore. ieee.org/document/9272649, Nov. 26, 2020, pp. 1552-1564.

* cited by examiner

100

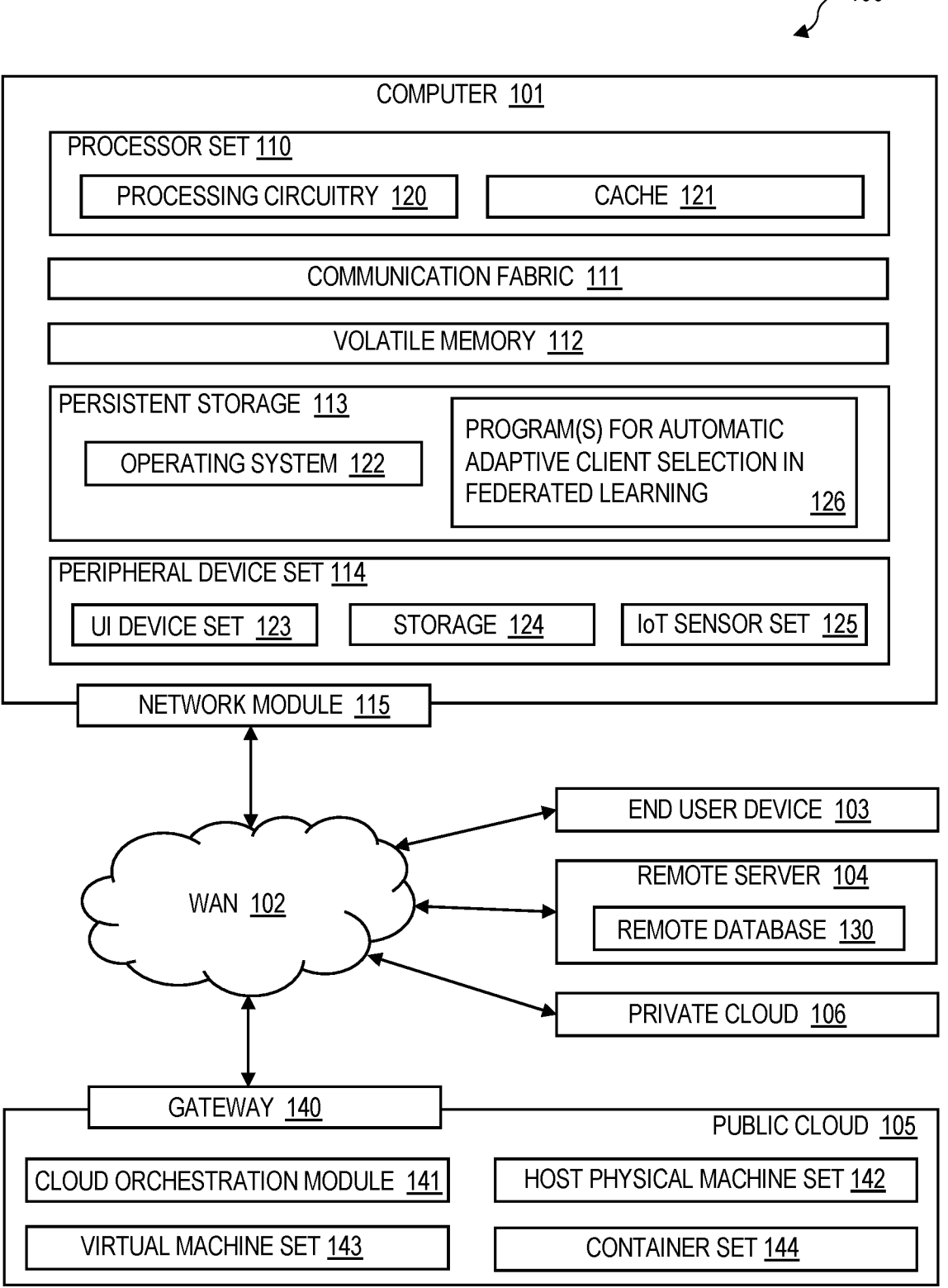

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

PROGRAM(S) FOR AUTOMATIC ADAPTIVE CLIENT SELECTION IN FEDERATED LEARNING        126

PERIPHERAL DEVICE SET 114

UI DEVICE SET 123        STORAGE 124        IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141        HOST PHYSICAL MACHINE SET 142

VIRTUAL MACHINE SET 143        CONTAINER SET 144

FIG. 1

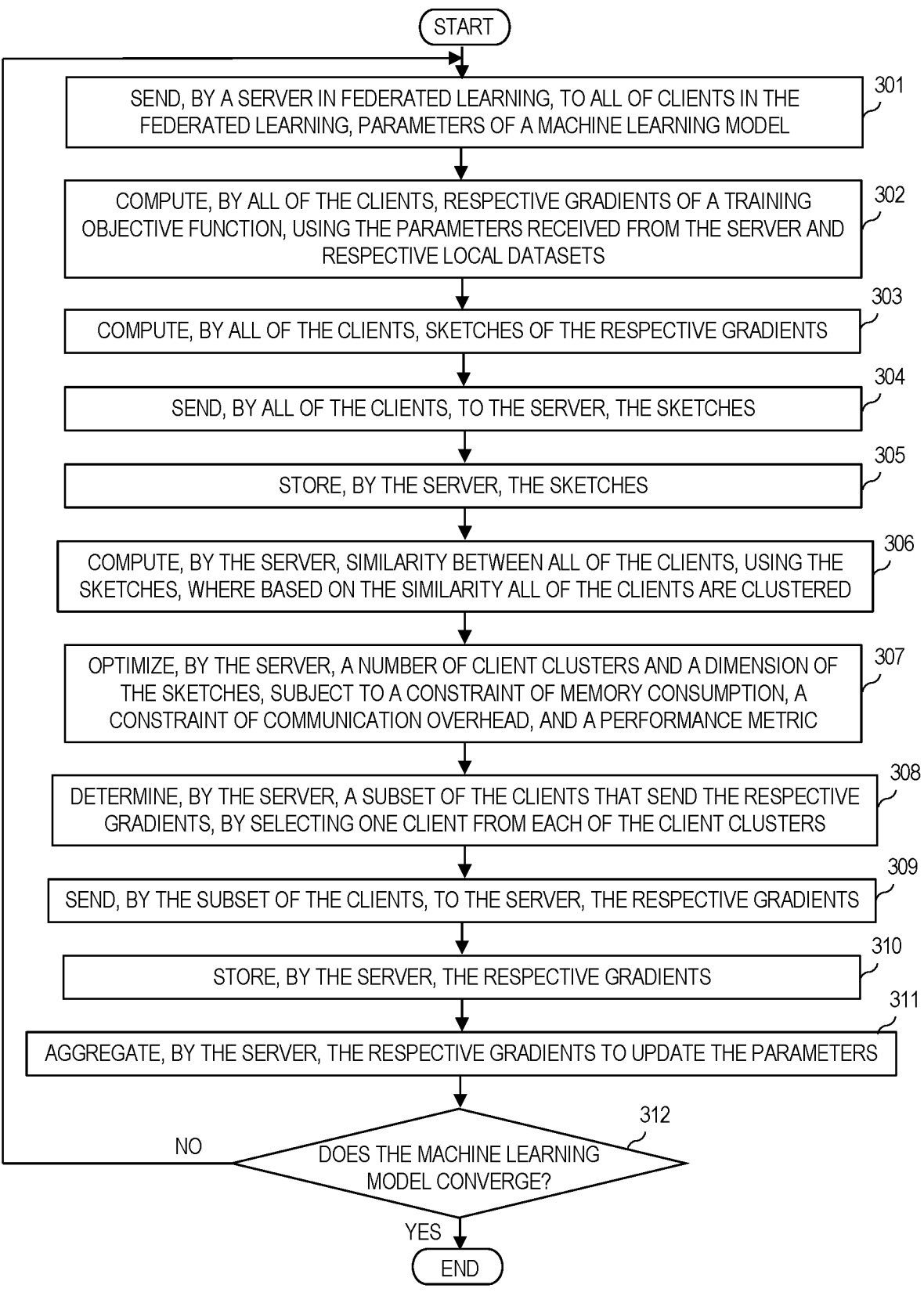

START

SEND, BY A SERVER IN FEDERATED LEARNING, TO ALL OF CLIENTS IN THE FEDERATED LEARNING, PARAMETERS OF A MACHINE LEARNING MODEL — 301

COMPUTE, BY ALL OF THE CLIENTS, RESPECTIVE GRADIENTS OF A TRAINING OBJECTIVE FUNCTION, USING THE PARAMETERS RECEIVED FROM THE SERVER AND RESPECTIVE LOCAL DATASETS — 302

COMPUTE, BY ALL OF THE CLIENTS, SKETCHES OF THE RESPECTIVE GRADIENTS — 303

SEND, BY ALL OF THE CLIENTS, TO THE SERVER, THE SKETCHES — 304

STORE, BY THE SERVER, THE SKETCHES — 305

COMPUTE, BY THE SERVER, SIMILARITY BETWEEN ALL OF THE CLIENTS, USING THE SKETCHES, WHERE BASED ON THE SIMILARITY ALL OF THE CLIENTS ARE CLUSTERED — 306

OPTIMIZE, BY THE SERVER, A NUMBER OF CLIENT CLUSTERS AND A DIMENSION OF THE SKETCHES, SUBJECT TO A CONSTRAINT OF MEMORY CONSUMPTION, A CONSTRAINT OF COMMUNICATION OVERHEAD, AND A PERFORMANCE METRIC — 307

DETERMINE, BY THE SERVER, A SUBSET OF THE CLIENTS THAT SEND THE RESPECTIVE GRADIENTS, BY SELECTING ONE CLIENT FROM EACH OF THE CLIENT CLUSTERS — 308

SEND, BY THE SUBSET OF THE CLIENTS, TO THE SERVER, THE RESPECTIVE GRADIENTS — 309

STORE, BY THE SERVER, THE RESPECTIVE GRADIENTS — 310

AGGREGATE, BY THE SERVER, THE RESPECTIVE GRADIENTS TO UPDATE THE PARAMETERS — 311

NO    DOES THE MACHINE LEARNING MODEL CONVERGE?    312

YES

END

FIG. 3

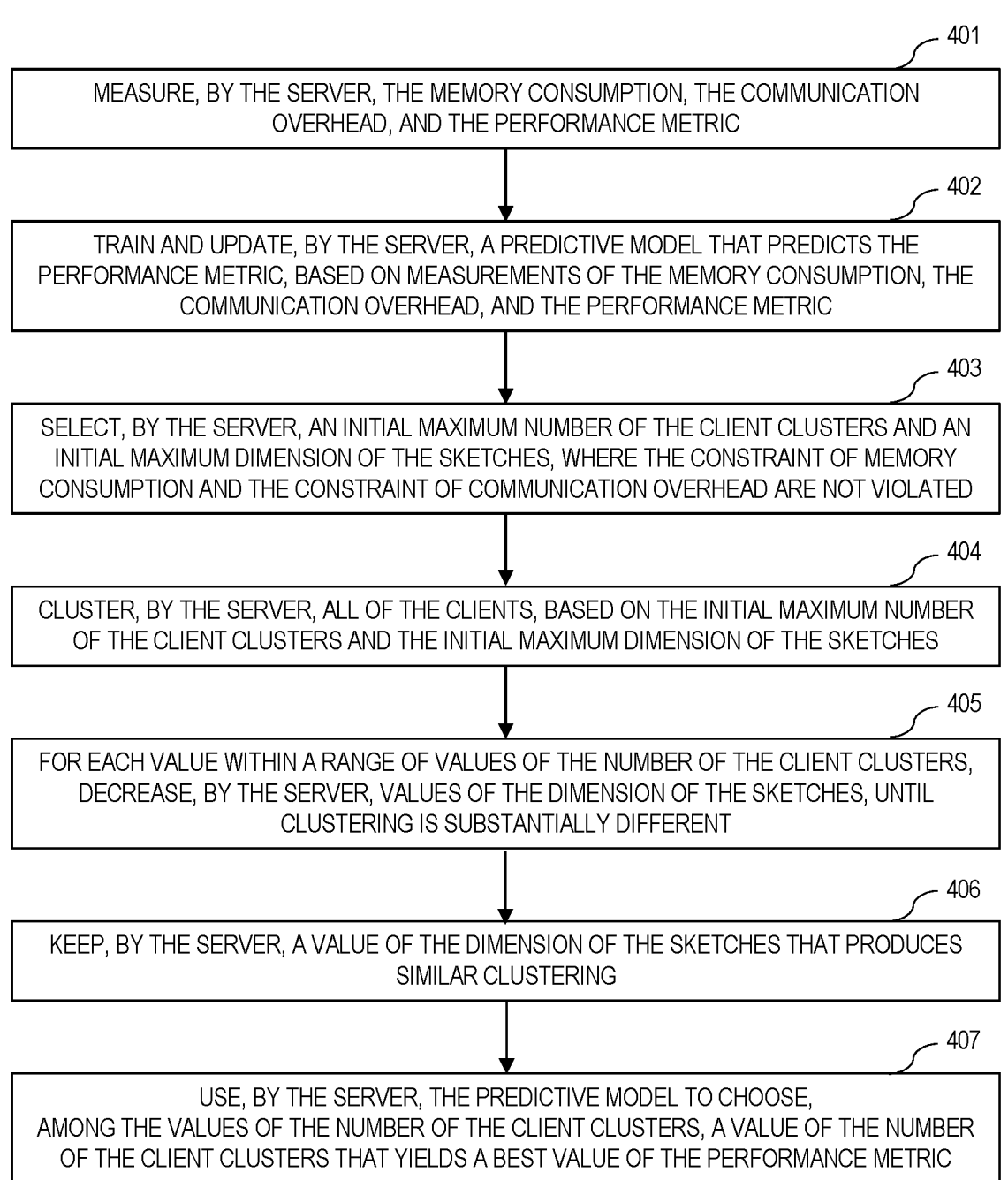

401

MEASURE, BY THE SERVER, THE MEMORY CONSUMPTION, THE COMMUNICATION OVERHEAD, AND THE PERFORMANCE METRIC

402

TRAIN AND UPDATE, BY THE SERVER, A PREDICTIVE MODEL THAT PREDICTS THE PERFORMANCE METRIC, BASED ON MEASUREMENTS OF THE MEMORY CONSUMPTION, THE COMMUNICATION OVERHEAD, AND THE PERFORMANCE METRIC

403

SELECT, BY THE SERVER, AN INITIAL MAXIMUM NUMBER OF THE CLIENT CLUSTERS AND AN INITIAL MAXIMUM DIMENSION OF THE SKETCHES, WHERE THE CONSTRAINT OF MEMORY CONSUMPTION AND THE CONSTRAINT OF COMMUNICATION OVERHEAD ARE NOT VIOLATED

404

CLUSTER, BY THE SERVER, ALL OF THE CLIENTS, BASED ON THE INITIAL MAXIMUM NUMBER OF THE CLIENT CLUSTERS AND THE INITIAL MAXIMUM DIMENSION OF THE SKETCHES

405

FOR EACH VALUE WITHIN A RANGE OF VALUES OF THE NUMBER OF THE CLIENT CLUSTERS, DECREASE, BY THE SERVER, VALUES OF THE DIMENSION OF THE SKETCHES, UNTIL CLUSTERING IS SUBSTANTIALLY DIFFERENT

406

KEEP, BY THE SERVER, A VALUE OF THE DIMENSION OF THE SKETCHES THAT PRODUCES SIMILAR CLUSTERING

407

USE, BY THE SERVER, THE PREDICTIVE MODEL TO CHOOSE, AMONG THE VALUES OF THE NUMBER OF THE CLIENT CLUSTERS, A VALUE OF THE NUMBER OF THE CLIENT CLUSTERS THAT YIELDS A BEST VALUE OF THE PERFORMANCE METRIC

FIG. 4

SKETCHED AND CLUSTERED FEDERATED LEARNING WITH AUTOMATIC TUNING

BACKGROUND

The present invention relates generally to federated learning, and more particularly to sketched and clustered federated learning with automatic tuning.

Federated learning is a distributed learning framework that enables training a model from decentralized data located at client sites, without the data ever leaving the client sites. Compared to a centralized model, in which training requires all the data to be transmitted to and stored in a central location (e.g., a data center), federated learning has the benefits of preserving data privacy while avoiding transmission of large volumes.

Enterprise federated learning allows clients (e.g., banks and hospitals) to collaboratively train/learn a global model on their cross-siloed data. For cost and resource efficiency of an enterprise federated learning system, it is often sufficient to have only a small subset of clients involved in a federated learning process, because some clients may have similar data. The model size is usually large for deep neural networks, and sending all model parameters of all clients can be very inefficient.

SUMMARY

In one aspect, a computer-implemented method for automatic adaptive client selection in federated learning is provided. The computer-implemented method includes sending, by a server in the federated learning, to all of clients in the federated learning, parameters of a machine learning model, where all of the clients compute respective gradients using the parameters. The computer-implemented method further includes receiving, by the server from all of the clients, sketches of the respective gradients, where the sketches are computed by all of the clients. The computer-implemented method further includes using, by the server, the sketches to compute similarity between all of the clients. The computer-implemented method further includes clustering, by the server, all of the clients, based on the similarity. The computer-implemented method further includes optimizing, by the server, a number of client clusters and a dimension of the sketches, subject to a constraint of memory consumption, a constraint of communication overhead, and a performance metric of the federated learning. The computer-implemented method further includes determining, by the server, a subset of the clients that send the respective gradients to the server, by selecting the clients from respective ones of the client clusters. The computer-implemented method further includes aggregating, by the server, the respective gradients sent by the subset of the clients.

In another aspect, a computer program product for automatic adaptive client selection in federated learning is provided. The computer program product comprises a computer readable storage medium having program instructions embodied therewith, and the program instructions are executable by one or more processors. The program instructions are executable to: send, by a server in the federated learning, to all of clients in the federated learning, parameters of a machine learning model, where all of the clients compute respective gradients using the parameters; receive, by the server from all of the clients, sketches of the respective gradients, where the sketches are computed by all of the clients; use, by the server, the sketches to compute similarity between all of the clients; cluster, by the server, all of the clients, based on the similarity; optimize, by the server, a number of client clusters and a dimension of the sketches, subject to a constraint of memory consumption, a constraint of communication overhead, and a performance metric of the federated learning; determine, by the server, a subset of the clients that send the respective gradients to the server, by selecting the clients from respective ones of the client clusters; and aggregate, by the server, the respective gradients sent by the subset of the clients.

In yet another aspect, a computer system for automatic adaptive client selection in federated learning is provided. The computer system comprises one or more processors, one or more computer readable tangible storage devices, and program instructions stored on at least one of the one or more computer readable tangible storage devices for execution by at least one of the one or more processors. The program instructions are executable to send, by a server in the federated learning, to all of clients in the federated learning, parameters of a machine learning model, where all of the clients compute respective gradients using the parameters. The program instructions are further executable to receive, by the server from all of the clients, sketches of the respective gradients, where the sketches are computed by all of the clients. The program instructions are further executable to use, by the server, the sketches to compute similarity between all of the clients. The program instructions are further executable to cluster, by the server, all of the clients, based on the similarity. The program instructions are further executable to optimize, by the server, a number of client clusters and a dimension of the sketches, subject to a constraint of memory consumption, a constraint of communication overhead, and a performance metric of the federated learning. The program instructions are further executable to determine, by the server, a subset of the clients that send the respective gradients to the server, by selecting the clients from respective ones of the client clusters. The program instructions are further executable to aggregate, by the server, the respective gradients sent by the subset of the clients.

BRIEF DESCRIPTION OF THE SEVERAL VIEWS OF THE DRAWINGS

FIG. 1 is a systematic diagram illustrating an example of an environment for the execution of at least some of the computer code involved in performing sketched and clustered federated learning with automatic tuning, in accordance with one embodiment of the present invention.

FIG. 3 present a flowchart showing operational steps of automatic adaptive client selection in federated learning, in accordance with one embodiment of the present invention.

FIG. 4 present a flowchart showing detailed operational steps of optimizing a number of client clusters and a dimension of the sketches included in a step shown in FIG. 3, in accordance with one embodiment of the present invention.

DETAILED DESCRIPTION

Figure 2:
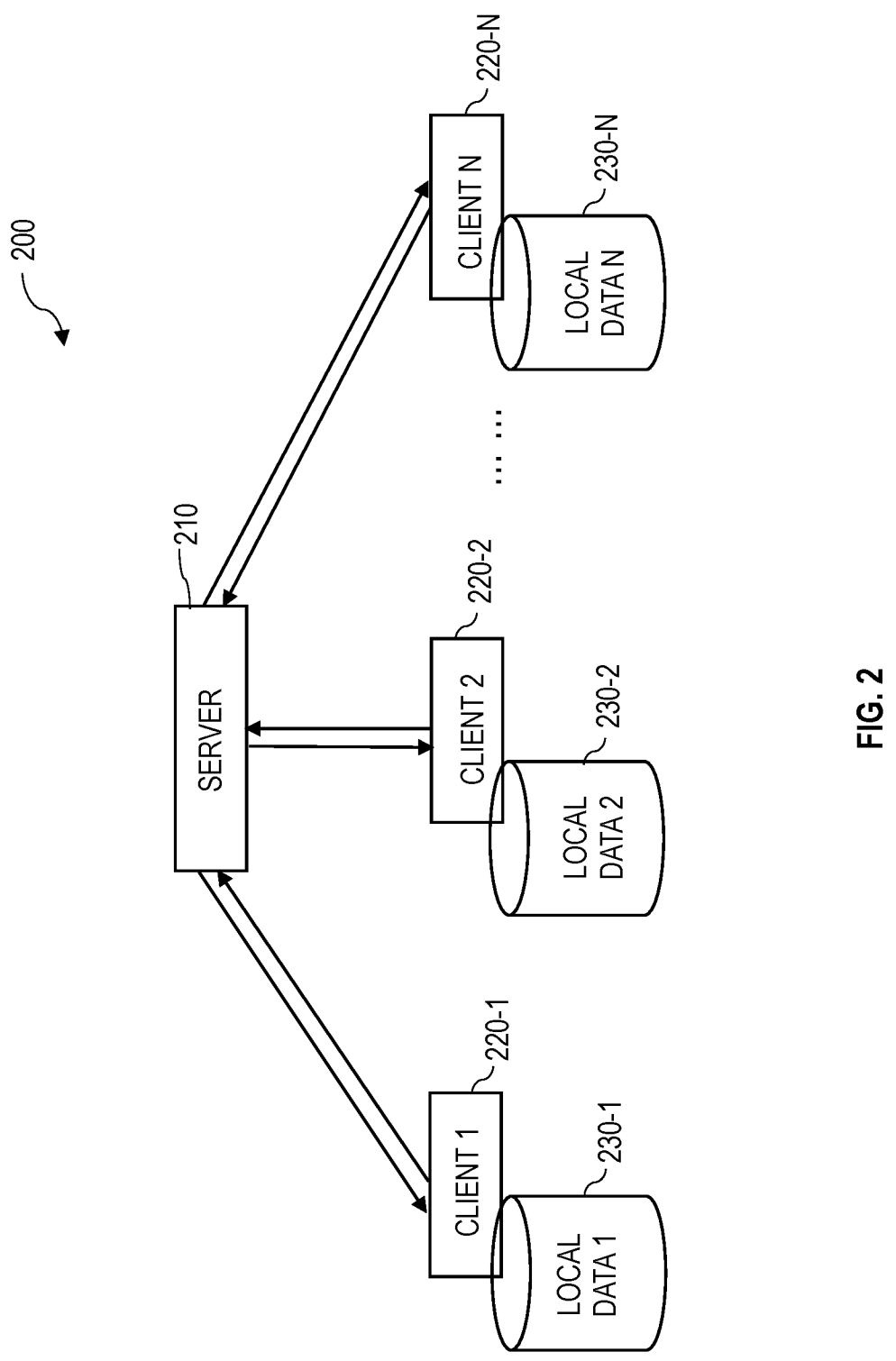
FIG. 2 is a systematic diagram illustrating a federated learning system, in accordance with one embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 1, computing environment 100 contains an example of an environment for the execution of at least some of the computer code involved in performing the inventive methods, such as program(s) 126 for automatic adaptive client selection in federated learning. In addition to program(s) 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present invention provide a solution for determining an optimal subset of clients in federated learning, and the solution is in a fully automatic and adaptive manner.

Embodiments of the present invention provide a method of speeding up transmitting and processing model parameters and their gradients. In the method, sketches of gradient vectors are transmitted. Similar gradient vectors are either in the same bucket with same hash code or are close to each other in the distance space. Sketches are vectors of floats with much lower dimension than gradients (e.g., 20 floating point numbers in a sketch versus thousands or millions in a gradient, depending on a model size).

Embodiments of the present invention provide a method of client selection in federated learning. The impact of client data distributions is captured by the gradients of clients in federated learning. Clients with similar gradients will have a similar effect on model training, so it is sufficient to use only one of the clients with similar gradients. Clients with dissimilar gradients will cause the model to be trained towards different directions, so it is good to keep all clients with dissimilar gradients. Training convergence speed is related to a gradient divergence that captures the similarity between local and global (or aggregated) gradients. In federated learning, a server asks all clients to provide sketches of gradients computed on the clients' local data. Based on the sketches, a subset of clients is selected to participate in the federated learning process.

Embodiments of the present invention provide a method of periodically updating a cluster size (c) and a sketching dimension (d) to meet a memory consumption constraint (M) and a communication overhead constraints (B) (e.g., total budget based or per iteration bounds) while not sacrificing on accuracy. In embodiments of the present invention, the dimension (d) on the sketched vectors and the number (c) of clusters during training are automatically adjusted. The higher the sketching dimension and the number of clusters, the higher the communication overhead and memory cost at a server and clients.

FIG. 2 is a systematic diagram illustrating federated learning system 200, in accordance with one embodiment of the present invention. Federated learning system 200 includes server 210. Federated learning system 200 further includes N clients, including client 1 220-1, client 2 220-2, . . . , and client N 220-N. The N clients (client 1 220-1, client 2 220-2, . . . , and client N 220-N) use local data 1 230-1, local data 2 230-2, . . . , and local data N 230-N, respectively, to train a machine learning model.

Server 210 may reside on a computing device or server. The N clients (client 1 220-1, client 2 220-2, . . . , and client N 220-N) may reside on respective ones of computing devices. A computing device or server may be any electronic device or computing system capable of receiving input from a user, executing computer program instructions, and communicating with another computing system via a network.

Federated learning system 200 may be implemented in a network that can be any combination of connections and protocols which support communications between server 210 and respective N clients (client 1 220-1, client 2 220-2, . . . , and client N 220-N). For example, the network may be the Internet which represents a worldwide collection of networks and gateways to support communications between devices connected to the Internet; the network may be implemented as an intranet, a local area network (LAN), a wide area network (WAN), and a wireless network.

Federated learning 200 generally includes following classic steps in each communication round. Server 210 sends model parameters to client 1 220-1, client 2 220-2, . . . , and client N 220-N. Each of client 1 220-1, client 2 220-2, . . . , and client N 220-N computes its updated model parameter using stochastic gradient descent and sends parameters or gradients to server 210. Server 210 aggregates the model parameter or gradient vectors received from client 1 220-1, client 2 220-2, . . . , and client N 220-N and updates the model parameter at server 210. The classic steps are repeated until convergence.

In federated learning system 200, in addition to the classic steps of federated learning, server 210 performs clustering with adaptive selection of updating a cluster size (c) and a sketching dimension (d). Server 210 maintains N sketch vector variables from the N clients and C gradient variables of selected clients, where C is a maximum number clusters. Server 210 further maintains measurements of resource consumptions (e.g., memory and/or bandwidth) and one or more corresponding performance metrics (accuracy, loss, or their rates of change defined as difference across communication rounds over number of iterations or bytes transmitted) for each (c, d) configuration (i.e., each configuration of a cluster size (c) and a sketching dimension (d)). Server 210 further maintains a predictive model that predicts the one or more performance metrics based on the (c, d) configuration and the measurements. Server 210 have a constraint M on the memory used for training at any time and a constraint B on the transmitted or received information during training.

FIG. 3 present a flowchart showing operational steps of automatic adaptive client selection in federated learning, in accordance with one embodiment of the present invention.

In step 301, a server in federated learning sends, to all of clients in the federated learning, parameters of a machine learning model. The server sends the parameters at the beginning of the federated learning and also at a certain frequency afterwards. In an embodiment shown in FIG. 2, server 210 sends the parameters to all of the N clients (client 1 220-1, client 2 220-2, . . . , and client N 220-N).

In step 302, all of the clients compute respective gradients of a training objective function, using the parameters received from the server and respective local datasets. Each client computes its gradient vector using the parameters. In an embodiment shown in FIG. 2, all of the N clients (client 1 220-1, client 2 220-2, . . . , and client N 220-N) compute the respective gradients, using the parameters received from server 210. In computing the gradients, client 1 220-1, client 2 220-2, . . . , and client N 220-N use local data 1 230-1, local data 2 230-2, . . . , and local data N 230-N, respectively.

In step 303, all of the clients compute sketches of the respective gradients. Each client computes its sketch vector from its gradient. In step 304, all of the clients send to the server the sketches. The sketches are vectors of floats with much lower dimensions than vectors of the respective gradients; therefore, the communication overhead is reduced by transmitting the respective sketches from all the clients to the server. In an embodiment shown in FIG. 2, all of the N clients (client 1 220-1, client 2 220-2, . . . , and client N 220-N) compute the sketches and then send the sketches to server 210.

Upon receiving the sketches form all of the clients, in step 305, the server stores the sketches. Further, in step 306, the server computes similarity between all of the clients, using the sketches. Based on the similarity, the server clusters all of the clients. The clients are clustered into c clusters, where c is a value ranged from 1 to C which is a maximum number of clusters. In an embodiment shown in FIG. 2, server 210 computes the similarity between client 1 220-1, client 2 220-2, . . . , and client N 220-N. Based on the similarity, server 210 clusters client 1 220-1, client 2 220-2, . . . , and client N 220-N into clusters.

In step 307, the server optimizes a number of client clusters and a dimension of the sketches, subject to a constraint of memory consumption, a constraint of communication overhead, and a performance metric. The server identifies a value of c which is an optimal number of client clusters and identifies a value of d that produces similar clustering; thus, the server obtains an optimal (c, d) configuration (i.e., configuration with the optimal number of client clusters and the value of d). With the values of c and d of the optimal (c, d) configuration, the constraint of memory consumption and the constraint of communication overhead are not violated, and a best value of the performance metric is yielded. The detail description of optimizing the number of client clusters and the dimension of the sketches will be given in later paragraphs with reference to FIG. 4.

In step 308, the server determines a subset of the clients that send the respective gradients, by selecting one client from each of the client clusters. According to the optimal (c, d) configuration, all of the clients are divided into c clusters; therefore, the server determines the subset with c clients. Clients in a same cluster have similar gradients and thus will have a similar effect on model training; therefore, selecting only one client from one cluster is sufficient. In an embodiment shown in FIG. 2, server 210 divides client 1 220-1, client 2 220-2, . . . , and client N 220-N into c cluster, and the subset of client 1 220-1, client 2 220-2, . . . , and client N 220-N includes c clients.

In step 309, clients in the subset (or c clients) send the respective gradients to the server. In step 310, the server stores the respective gradients. In step 311, the server aggregates the respective gradients to update the parameters.

In step 312, the server determines whether the machine learning model converges. In response to determining that the machine learning model converges (YES branch of step 312), the federated learning is completed. In response to determining that the machine learning model does not converge (NO branch of step 312), a next communication round starts, and steps 301-312 are iterated. In the next communication round, the server sends the parameters to all of the clients, all of the clients send the respective sketches of gradients to the server, the server determines the subset of the clients, the clients in the subsets send gradients, and the server again aggregates the gradients sent by the subset of the clients. Selected clients in this iteration may be different from selected clients the last iteration.

In the embodiment presented in FIG. 3, all N clients transmit the sketches. This federated learning process yields more accuracy but higher communication overhead than other embodiments described as follows.

In a second embodiment, only selected clients transmit sketches. This federated learning process is more communication efficient but potentially less accurate. The federated learning process of the second embodiment may be used in scenarios where many clients are involved. In the first communication round, all clients upload their initial sketches and which are stored on the server. In the communication round t, after client selection, only the selected clients send their sketches to the server, and the server stores the gradients. In the communication round t+1, the server uses the stored gradients from the selected client to cluster and select clients that will send their gradients. The stored gradients may contain past and recent gradients of selected clients. The selected clients send their gradients, and server aggregates the gradients and sends them back to all clients for updating.

In a third embodiment, a superset of selected clients transmit sketches. This embodiment is a mix of the last two embodiments. In the third embodiment, the server selects D clients from N clients (C<D<N). The N clients send sketches of their gradients to the server. The D clients are selected from a set of clients that have not recently selected to update their gradients. Server stores the gradients. The server clusters the N clients based on N sketches and then selects C clients from the D clients. The C clients send their gradients to the server. The server aggregates the gradients from the C clients and then sends them back to all clients for updating.

FIG. 4 present a flowchart showing detailed operational steps of optimizing a number of client clusters and a dimension of the sketches included in step 307 shown in FIG. 3, in accordance with one embodiment of the present invention.

In step 401, the server measures the memory consumption, the communication overhead, and the performance metric. The memory consumption is due to computing the gradients by the clients, computing the sketches by the clients, computing the similarity by the server, clustering the clients by the server, determining the optimal (c, d) configuration by the server, and aggregating the gradients by the server. The communication overhead is due to sending the parameters form the server to the clients, sending the sketches from the clients to the server, and sending the gradients from the subset of the clients to the server. The performance metric may be loss, accuracy, or the rate of loss decrease or accuracy increase (which is obtained by dividing the amount of change over additive resources such as communication).

In step 402, the server trains and updates a predictive model that predicts the performance metric, based on measurements of the memory consumption, the communication overhead, and the performance metric. The server uses the measurement data of the memory consumption, the communication overhead, and the performance metric to train the predictive model. The predictive model will be used by the server to predict the one or more performance metrics (e.g., loss, accuracy, or the rate of loss decrease or accuracy increase). Through steps 401 and 402, the predictive model is trained and updated in each communication round in the federated learning.

In step 403, the server selects an initial maximum number of the client clusters and an initial maximum dimension of the sketches, where the constraint of memory consumption and the constraint of communication overhead are not violated. Selecting the initial maximum number of the client clusters and the initial maximum dimension of the sketches is based on the above-mentioned measurements, the constraint of memory consumption, and the constraint of communication overhead. In step 404, the server clusters all of the clients, based on the initial maximum number of the client clusters and the initial maximum dimension of the sketches.

In step 405, the server, for each value within a range of values of the number of the client clusters, decreases values of the dimension of the sketches, until clustering is substantially different. In step 406, the server keeps a value of the dimension of the sketches that produces similar clustering. In step 407, the server uses the predictive model to choose, among the values of the number of the client clusters, a value of the number of the client clusters that yields a best value of the performance metric (e.g., maximizes the rate of loss decrease). Through these steps, the server obtains the optimal (c, d) configuration or optimizes the number of client clusters and the dimension of the sketches.

Experimentation was conducted to compare the present invention with two baseline approaches including random client selection and non-adaptive clustering. The approach of random client selection or FedAvg (McMahan et al., "Communication-Efficient Learning of Deep Networks from Decentralized Data", Proceedings of the 20th International Conference on Artificial Intelligence and Statistics, 2017) is currently the predominant algorithm used for training in federated learning. The algorithm reduces communication overhead at each global round by performing multiple stochastic gradient descent local iterations at the clients and randomly selecting a small subset of the clients to compute and send updates to the server. The approach of non-adaptive clustering (Fraboni et al., "Clustered Sampling: Low-Variance and Improved Representativity for Clients Selection in Federated Learning", Proceedings of the 38th International Conference on Machine Learning, 2021) involves hierarchical clustering of the clients based on a similarity metric on the gradients and sampling from these clusters.

The experimental setup included 100 clients, where each client was provided with data from one partition of the MNIST (Modified National Institute of Standards and Technology database) training images; these partitions were of equal sizes, and their label composition was dictated by a Dirichlet distribution with a parameter which controls the heterogeneity of the split. At each global round, 10 clients were selected for performing the server aggregation step. Each client was trained for 10 iterations between any two successive global rounds using stochastic gradient descent, for a total of 200 global rounds and the data split among the clients was done according to a Dirichlet distribution with the parameter controlling the heterogeneity of the split. Experimental evaluations showed that the present invention had a low communication overhead and demonstrated better convergence performance than random client selection and non-adaptive clustering approaches. In the experimentation, better accuracy and 8× less communication overhead were observed.

What is claimed is:

1. A computer-implemented method for automatic adaptive client selection in federated learning, the method comprising:

sending, by a server in the federated learning, to all of clients in the federated learning, parameters of a machine learning model, wherein all of the clients compute respective gradients using the parameters;

receiving, by the server from all of the clients, sketches of the respective gradients, wherein the sketches are computed by all of the clients;

using, by the server, the sketches to compute similarity between all of the clients;

clustering, by the server, all of the clients, based on the similarity;

optimizing, by the server, a number of client clusters and a dimension of the sketches, subject to a constraint of memory consumption, a constraint of communication overhead, and a performance metric of the federated learning;

determining, by the server, a subset of the clients that send the respective gradients to the server, by selecting the clients from respective ones of the client clusters; and aggregating, by the server, the respective gradients sent by the subset of the clients.

2. The computer-implemented method of claim 1, further comprising:

in response to determining that the machine learning model does not converge, iterating, by the server, steps of sending the parameters to all of the clients, receiving the sketches from all of the clients, using the sketches to compute the similarity, clustering all of the clients, optimizing the number of the client clusters and the dimension of the sketches, determining the subset of the clients, and aggregating the respective gradients sent by the subset of the clients.

3. The computer-implemented method of claim 1, for optimizing the number of the client clusters and the dimension of the sketches, further comprising:

measuring, by the server, the memory consumption, the communication overhead, and the performance metric; and training and updating, by the server, a predictive model predicting the performance metric, based on measurements of the memory consumption, the communication overhead, and the performance metric.

4. The computer-implemented method of claim 1, for optimizing the number of the client clusters and the dimension of the sketches, further comprising:

selecting, by the server, an initial maximum number of the client clusters and an initial maximum dimension of the sketches, wherein the constraint of the memory consumption and the constraint of the communication overhead are not violated;

clustering, by the server, all of the clients, based on the initial maximum number of the client clusters and the initial maximum dimension of the sketches;

for each value within a range of values of the number of the client clusters, decreasing, by the server, values of the dimension of the sketches, until clustering is substantially different;

keeping, by the server, a value of the dimension of the sketches that produces similar clustering; and choosing, by the server, among the values of the number of the client clusters, a value of the number of the client clusters that yields a best value of the performance metric, by using a predictive model predicting the performance metric, wherein the predictive model is trained and updated based on measurements of the memory consumption, the communication overhead, and the performance metric.

5. The computer-implemented method of claim 1, further comprising:

selecting, by the server, one client from each of the client clusters.

6. The computer-implemented method of claim 1, further comprising:

storing, by the server, the sketches; and storing, by the server, the respective gradients.

7. The computer-implemented method of claim 1, wherein the sketches are vectors of floats with lower dimensions than the respective gradients.

8. A computer program product for automatic adaptive client selection in federated learning, the computer program product comprising a computer readable storage medium having program instructions embodied therewith, the program instructions executable by one or more processors, the program instructions executable to:

send, by a server in the federated learning, to all of clients in the federated learning, parameters of a machine learning model, wherein all of the clients compute respective gradients using the parameters;

receive, by the server from all of the clients, sketches of the respective gradients, wherein the sketches are computed by all of the clients;

use, by the server, the sketches to compute similarity between all of the clients;

cluster, by the server, all of the clients, based on the similarity;

optimize, by the server, a number of client clusters and a dimension of the sketches, subject to a constraint of memory consumption, a constraint of communication overhead, and a performance metric of the federated learning;

determine, by the server, a subset of the clients that send the respective gradients to the server, by selecting the clients from respective ones of the client clusters; and aggregate, by the server, the respective gradients sent by the subset of the clients.

9. The computer program product of claim 8, further comprising the program instructions executable to:

in response to determining that the machine learning model does not converge, iterate, by the server, steps of sending the parameters to all of the clients, receiving the sketches from all of the clients, using the sketches to compute the similarity, clustering all of the clients, optimizing the number of the client clusters and the dimension of the sketches, determining the subset of the clients, and aggregating the respective gradients sent by the subset of the clients.

10. The computer program product of claim 8, for optimizing the number of the client clusters and the dimension of the sketches, further comprising the program instructions executable to:

measure, by the server, the memory consumption, the communication overhead, and the performance metric; and train and update, by the server, a predictive model predicting the performance metric, based on measurements of the memory consumption, the communication overhead, and the performance metric.

11. The computer program product of claim 8, for optimizing the number of the client clusters and the dimension of the sketches, further comprising the program instructions executable to:

select, by the server, an initial maximum number of the client clusters and an initial maximum dimension of the sketches, wherein the constraint of the memory consumption and the constraint of the communication overhead are not violated;

cluster, by the server, all of the clients, based on the initial maximum number of the client clusters and the initial maximum dimension of the sketches;

for each value within a range of values of the number of the client clusters, decrease, by the server, values of the dimension of the sketches, until clustering is substantially different;

keep, by the server, a value of the dimension of the sketches that produces similar clustering; and choose, by the server, among the values of the number of the client clusters, a value of the number of the client clusters that yields a best value of the performance metric, by using a predictive model predicting the performance metric, wherein the predictive model is trained and updated based on measurements of the memory consumption, the communication overhead, and the performance metric.

12. The computer program product of claim 8, further comprising the program instructions executable to:

select, by the server, one client from each of the client clusters.

13. The computer program product of claim 8, further comprising program instructions executable to:

store, by the server, the sketches; and store, by the server, the respective gradients.

14. The computer program product of claim 8, wherein the sketches are vectors of floats with lower dimensions than the respective gradients.

15. A computer system for automatic adaptive client selection in federated learning, the computer system comprising one or more processors, one or more computer readable tangible storage devices, and program instructions stored on at least one of the one or more computer readable tangible storage devices for execution by at least one of the one or more processors, the program instructions executable to:

send, by a server in the federated learning, to all of clients in the federated learning, parameters of a machine learning model, wherein all of the clients compute respective gradients using the parameters;

receive, by the server from all of the clients, sketches of the respective gradients, wherein the sketches are computed by all of the clients;

use, by the server, the sketches to compute similarity between all of the clients;

cluster, by the server, all of the clients, based on the similarity;

optimize, by the server, a number of client clusters and a dimension of the sketches, subject to a constraint of memory consumption, a constraint of communication overhead, and a performance metric of the federated learning;

determine, by the server, a subset of the clients that send the respective gradients to the server, by selecting the clients from respective ones of the client clusters; and aggregate, by the server, the respective gradients sent by the subset of the clients.

16. The computer system of claim 15, further comprising the program instructions executable to:

in response to determining that the machine learning model does not converge, iterate, by the server, steps of sending the parameters to all of the clients, receiving the sketches from all of the clients, using the sketches to compute the similarity, clustering all of the clients, optimizing the number of the client clusters and the dimension of the sketches, determining the subset of the clients, and aggregating the respective gradients sent by the subset of the clients.

17. The computer system of claim 15, for optimizing the number of the client clusters and the dimension of the sketches, further comprising the program instructions executable to:

measure, by the server, the memory consumption, the communication overhead, and the performance metric; and train and update, by the server, a predictive model predicting the performance metric, based on measurements of the memory consumption, the communication overhead, and the performance metric.

18. The computer system of claim 15, for optimizing the number of the client clusters and the dimension of the sketches, further comprising the program instructions executable to:

select, by the server, an initial maximum number of the client clusters and an initial maximum dimension of the sketches, wherein the constraint of the memory consumption and the constraint of the communication overhead are not violated;

cluster, by the server, all of the clients, based on the initial maximum number of the client clusters and the initial maximum dimension of the sketches;

for each value within a range of values of the number of the client clusters, decrease, by the server, values of the dimension of the sketches, until clustering is substantially different;

keep, by the server, a value of the dimension of the sketches that produces similar clustering; and choose, by the server, among the values of the number of the client clusters, a value of the number of the client clusters that yields a best value of the performance metric, by using a predictive model predicting the performance metric, wherein the predictive model is trained and updated based on measurements of the memory consumption, the communication overhead, and the performance metric.

19. The computer system of claim 15, further comprising the program instructions executable to:

select, by the server, one client from each of the client clusters.

20. The computer system of claim 15, wherein the sketches are vectors of floats with lower dimensions than the respective gradients.

* * * * *